(12) United States Patent
Koch

(10) Patent No.: US 8,857,475 B2
(45) Date of Patent: Oct. 14, 2014

(54) METHOD AND SYSTEM FOR REHABILITATING AN OLD PIPE

(75) Inventor: Elmar Koch, Eslohe (DE)

(73) Assignee: Tracto-Technik GmbH & Co. KG, Lennestadt (DE)

( * ) Notice: Subject to any disclaimer, the term of this patent is extended or adjusted under 35 U.S.C. 154(b) by 0 days.

(21) Appl. No.: 13/520,927

(22) PCT Filed: Jan. 7, 2011

(86) PCT No.: PCT/EP2011/000039
§ 371 (c)(1),
(2), (4) Date: Dec. 6, 2012

(87) PCT Pub. No.: WO2011/083085
PCT Pub. Date: Jul. 14, 2011

(65) Prior Publication Data
US 2013/0087236 A1    Apr. 11, 2013

(30) Foreign Application Priority Data
Jan. 7, 2010   (DE) .......................... 10 2010 004 097

(51) Int. Cl.
*F16L 55/16*    (2006.01)
*F16L 55/165*   (2006.01)

(52) U.S. Cl.
CPC ........... *F16L 55/165* (2013.01); *F16L 55/1658* (2013.01); *F16L 55/1652* (2013.01)
USPC .............................. 138/98; 138/97; 405/184.3

(58) Field of Classification Search
USPC .......................... 138/98, 97; 405/184.3, 184.2
See application file for complete search history.

(56) References Cited

U.S. PATENT DOCUMENTS

| | | | | |
|---|---|---|---|---|
| 4,720,211 A * | 1/1988 | Streatfield et al. | ......... | 405/184.3 |
| 4,777,984 A * | 10/1988 | Storah | .............. | 138/98 |
| 5,048,174 A * | 9/1991 | McGuire | ......... | 29/451 |
| 5,626,801 A * | 5/1997 | McMillan et al. | ............. | 264/28 |
| 5,839,475 A * | 11/1998 | Maine et al. | ..................... | 138/98 |
| 6,270,612 B1 * | 8/2001 | Bradshaw | ..................... | 156/234 |
| 6,524,031 B2 * | 2/2003 | Carter et al. | ................ | 405/184.3 |
| 6,755,593 B2 * | 6/2004 | Wentworth et al. | ........ | 405/184.3 |
| 6,793,442 B2 * | 9/2004 | Carter et al. | ................ | 405/184.3 |
| 7,726,028 B2 | 6/2010 | Koch et al. | | |
| 7,824,130 B2 | 11/2010 | Koch et al. | | |
| 8,075,224 B2 | 12/2011 | Koch et al. | | |
| 2011/0150577 A1 | 6/2011 | Koch et al. | | |

FOREIGN PATENT DOCUMENTS

| | | |
|---|---|---|
| DE | 89 06 997 U1 | 7/1989 |
| DE | 195 12 602 C1 | 9/1996 |
| DE | 10 2005 045050 A1 | 3/2007 |
| DE | 10 2006 030 802 A1 | 1/2008 |
| EP | 0 445 326 A1 | 9/1991 |
| GB | 2 218 486 A | 11/1989 |
| GB | 2 397 284 A | 7/2004 |

* cited by examiner

*Primary Examiner* — Patrick F Brinson
(74) *Attorney, Agent, or Firm* — Howard IP Law Group, PC

(57) ABSTRACT

In a method for rehabilitating an old pipe, the outer diameter of a new pipe, which is at least equal to the inner diameter of the old pipe, is initially reduced, and the new pipe is then inserted into the old pipe, the outer diameter of the new pipe remaining at least partially reduced during the insertion process. The invention is characterized in that an expanding device is moved through the old pipe ahead of the new pipe.

10 Claims, 4 Drawing Sheets

METHOD AND SYSTEM FOR REHABILITATING AN OLD PIPE

CROSS-REFERENCES TO RELATED APPLICATIONS

This application is the U.S. National Stage of International Application No. PCT/EP2011/000039, filed Jan. 17, 2011, which designated the United States and has been published as International Publication No. WO 2011/083085 and which claims the priority of German Patent Application, Serial No. 10 2010 004 097.5, filed Jan. 7, 2010, pursuant to 35 U.S.C. 119(a)-(d).

BACKGROUND OF THE INVENTION

The invention relates to a method for rehabilitating an old pipe, in which the outer diameter of a new pipe which at least corresponds to the inner diameter of the old pipe, is initially reduced and the new pipe is then pulled into the old pipe. The invention further relates to a system for carrying out such a method.

A method of the generic type which is also known under the term "swagelining" is for example disclosed in GB 2 218 486 A. In the method disclosed therein, a liner pipe (a so called liner), which is made of a plastic with shape memory, is pulled through a reduction device which has a conically tapered opening whereby the pipe is radially compressed. By this, the diameter of the liner pipe whose outer diameter in the initial state corresponds at least to the inner diameter of the old pipe, is reduced by up to 15%, which enables the liner pipe to be pulled through the old pipe which is laid underground and which is to be lined with the liner pipe with relatively small force. After drawing in the liner pipe into the old pipe the liner pipe is relieved of stress so that the latter expands again due to the shape memory of the plastic and—due to the outer diameter which exceeds the inner diameter of the old pipe—rests against the inner wall of the old pipe under pressure. In this way a gap between the old pipe and the liner pipe can be avoided, which otherwise could undesirably lead to the gap acting as drainage between the old and the liner pipe or being pervaded by roots, which depending on the circumstances can indent the liner pipe and thereby reduce the free flow through.

A problem in the method known from GB 2 218 486 is that this method is only usable for rehabilitation of old pipes whose inner sheath surface is intact and which in particular have no deformed or caved in sections or offsets, as they occur for example in the region of pipe sleeves. Old pipes made of brittle materials, such as for example stoneware or concrete regularly have at least several breaks in which either a part of the sheath is broken or caved in or in which two pipe sections which are separated from one another by a brake form an offset. The method known from GB 2 218 486 A is not regularly usable for such old pipes.

SUMMARY OF THE INVENTION

In addition, old pipes which are to be rehabilitated by means of swagelining, have to be sufficiently clean, which regularly requires a thorough cleaning, in which the sediments which have bee formed in the old pipe over decades of use have to be removed; these sediments would hinder the drawing in. This cleaning process however is time consuming and associated with high costs.

Based on this state of the art the invention was based on the object to provide an improved method for rehabilitating an old pipe. In particular, a possibility was to be provided which enables to use the method steps known from swagelining also in such old pipes in which its use was thus far impossible.

This object is solved by a method for rehabilitating an old pipe which includes the steps of reducing an outer diameter of a new pipe, wherein the outer diameter corresponds at least to an inner diameter of the old pipe, and introducing the new pipe into the old pipe, wherein the reduction of the outer diameter is at least partially maintained during the introducing step A system which is suitable for carrying out the method according to the invention includes a reduction device for reducing an outer diameter of a new pipe to a value smaller or equal to an inner diameter of an old pipe, and a widening device, wherein the widening device has a maximal outer diameter which substantially corresponds to the inner diameter of the old pipe. Advantageous embodiments of the method according to the invention or respectively, of the system according to the invention are the subject matter of the respective dependent patent claims and follow from the following description of the invention.

The core of the invention is to use a method which corresponds to the described swagelining, in connection with a widening device which is moved—as directly as possible—ahead of the new pipe through the old pipe.

"Widening device" according to the invention relates to a device which is capable to convert the old pipe into a state in which the old pipe is suitable for rehabilitation by means of swagelining. A widening device according to the invention is accordingly configured so that the latter for example forms caved in or deformed sections of the old pipe back into the original cross section, evens out offsets which may be present in the old pipe line as the case may be, and/or removes sediments in the old pipe line.

In the method according to the inventing for rehabilitating an old pipe, the diameter of a new pipe which corresponds at least to the inner diameter of the old pipe is initially reduced and the new pipe then introduced into the old pipe line wherein a widening device is moved through the old pipe ahead of the new pipe.

A corresponding system according to the invention for carrying out such a method has at least a reduction device for reducing the outer diameter of the new pipe to a value smaller or equal to the inner diameter of the old pipe which is laid underground and a widening device whose greatest outer diameter essentially corresponds to the inner diameter of the old pipe line.

The method according to the invention does not relate exclusively to pipes which are laid underground, as for example those of water supply and water disposal and gas supply, but can also be used in the rehabilitation of any desired other pipe line. This also includes pipe lines which are installed exposed above ground or in fills; for example drainage pipes in land fills.

In a preferred embodiment of the method according to the invention, the outer diameter of the new pipe (which preferably has a circular cross section) is reduced by compressing the new pipe in radial direction before it enters into the old pipe. This can preferably occur by means of a reduction device, through which the new pipe is pulled.

Such a reduction device can preferably be configured so that the latter has an opening which is conically tapered in longitudinal direction and whose greatest diameter is greater or equal to the outer diameter of the new pipe in its initial state and whose smallest diameter is smaller or equal to the desired outer diameter of the new pipe in its compressed state.

In a preferred embodiment of the method according to the invention, the new pipe can be heated. The heating can occur before and during the reduction of the outer diameter of the new pipe; a heating of the new pipe can (also) be provided during the pulling into the old pipe. The heating allows the forces which are required for reducing the outer diameter of the new pipe and for maintaining the reduction to be reduced.

A (partial) maintaining of the reduction of the outer diameter of the new pipe during the pulling in can occur in different manners. For example, a material with a so called shape memory can be used for the new pipe which automatically only re-forms into its original state after a certain relaxation time. Until this re-forming is completed, the new pipe can already have been completely introduced into the old pipe. Another possibility can be to apply (external) forces to avoid an excessive re-forming of the new pipe during the introduction into the old pipe. This can for example occur by closing the new pipe at its end sides and by generating a negative pressure in the new pipe which counteracts the re-forming of the new pipe.

A reduction of the outer diameter can also be established and maintained by generating tensile stresses in the new pipe by which the new pipe is stretched in longitudinal direction, wherein at the same time due to the transverse contraction a reduction of the cross section of the new pipe occurs. The application of a defined tensile stress can for example occur by introducing tensile forces into one of the ends of the new pipe in order to pull the latter into the old pipe and counter forces act on a section of the new pipe which section is located at a distance to this end. These counter forces can for example be generated by pulling the new pipe through a reduction device under pressure.

The re-forming of the new pipe does not have to be (exclusively) based on a shape memory of the material which is used for the new pipe. It is also possible to actively cause a re-forming of the new pipe after introduction into the old pipe by applying external forces, which cause the re-forming or at least support the re-forming. Such forces can for example be established by generating an overpressure in the new pipe which is closed at its end-sides.

The widening device of the system according to the invention can preferably include a conical base body, whose greatest diameter preferably corresponds to the inner diameter of the old pipe. When such a widening device is moved through the old pipe the latter can be widened again at deformed or caved in sites and thereby formed back into its original cross section; also, offsets can be compensated in the old pipe, wherein the widening device or respectively, its conical base body for this purpose preferably has a cylindrical section whose outer diameter essentially corresponds to the inner diameter of the old pipe. The conical shape (of a section) of the base body allows preventing a "getting stuck" of the widening body when the latter is moved through the old pipe.

In a further preferred embodiment of the system according to the invention, the widening device can further include an adapter element which has first fastening means at one side for fastening on the new pipe and second fastening means at another side for fastening on a pulling means. The pulling means serve for pulling the widening device and the new pipe through the old pipe. The adapter element can preferably further be supported in an opening along the longitudinal axis of the conical base body, which allows to initially connect the adapter element with the new pipe and to push the new pipe then through opening along the longitudinal axis of the base body in order to subsequently connect the latter to a pulling means. Such a construction allows a simple and uncomplicated connection of the new pipe and the widening device to the pulling means.

In a further preferred embodiment of the system according to the invention, the adapter element has at least one stop via which the adapter element is supported on the conical base body in order to support the pulling forces on the adapter element which pulling forces are conducted into the pulling means to pull the widening device and the new pipe through the old pipe. This allows preventing the possibly of very high pulling forces which may be required for re-shaping the old pipe from being conducted into the new pipe, which may cause damage to the new pipe in particular when it is made from plastic.

BRIEF DESCRIPTION OF THE DRAWING

In the following, the invention is explained in more detail by way of an exemplary embodiment which is shown in the drawings.

In the drawings it is shown in

DETAILED DESCRIPTION OF PREFERRED EMBODIMENTS

Figure 1:
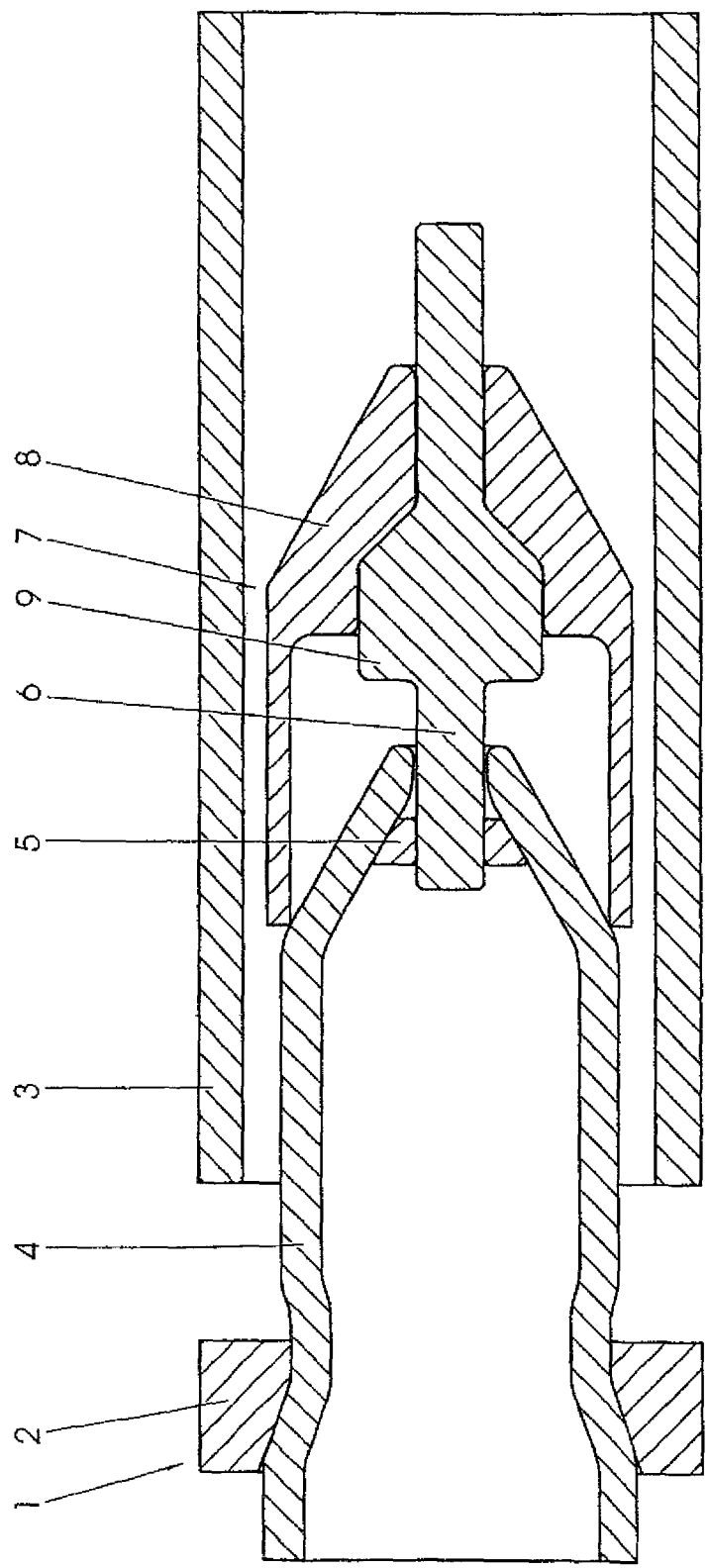
FIG. 1 a system according to the invention in a schematic representation of the components of FIG. 2 a cross section through an old pipe before rehabilitation FIG. 3 the cross section of the old pipe shown in FIG. 2 with a pulled in new pipe whose diameter has been reduced.

FIG. 1 shows a system according to the invention in a schematic representation. This includes a reduction device 1 which includes a ring shaped frame 2 which forms a conical opening. The reduction device is positioned in a not shown excavation in front of an old pipe which is laid under ground and leads into the construction hole, wherein the arrangement of the reduction device 1 in the excavation is such that the conical opening has a smaller diameter on the side of the mouth of the old pipe 3 than the opposing side.

A front end of a new pipe 4 is pushed through the opening of the reduction device 1, wherein the new pipe 4 is initially compressed to a diameter which corresponds to the smallest diameter of the conical opening of the reduction device 1. The section of the new pipe which exits form the reduction device is then subjected to a certain radial deformation wherein however, a reduction of the outer diameter of the new pipe 4 is maintained compared to the original state.

Different than shown in FIG. 1, the outer diameter of the new pipe 4 in the original state corresponds at least to the inner diameter of the old pipe 3 and is preferably even slightly greater. This allows achieving that the new pipe 4 after being drawn in and has completely re-formed, completely rests against the inner wall of the old pipe 3 without gap formation.

After the front end to the new pipe 4 has been pushed through the reduction device 1 the reduction device 1 is connected with a rear end of an adapter element 6 by means of a conventional fastening element 5. This adapter element 6 is a component of a widening device 7 of the system according to the invention. The adapter element 6 itself is insertable into a central bore of a conical base body 8 of the widening device 7, wherein a ring shaped shoulder of the adapter element 6 engages in a corresponding enlarged recess of the central bore of the base body where it abuts. A front end of the adapter element 6 then protrudes out of the base body 8 of the widening device 7. On this front end a pulling means (not shown) such as for example a pulling rod assembly, a chain or a rope, can then be fastened via a conventional fastening element (not shown) which pulling means is laid through the old pipe and extends into a not shown machine excavation. A pulling device (not shown) which is arranged there can continuously or stepwise apply pulling forces to the pulling means in order to pull the widening device 7 with the new pipe which is attached to the widening device into the old pipe. Due to the possibly very high forces which are required for the re-shaping of the old pipe by means of the widening device, these are preferably a hydraulic linear pulling device as it is sufficiently known from the state of the art.

Figure 2:
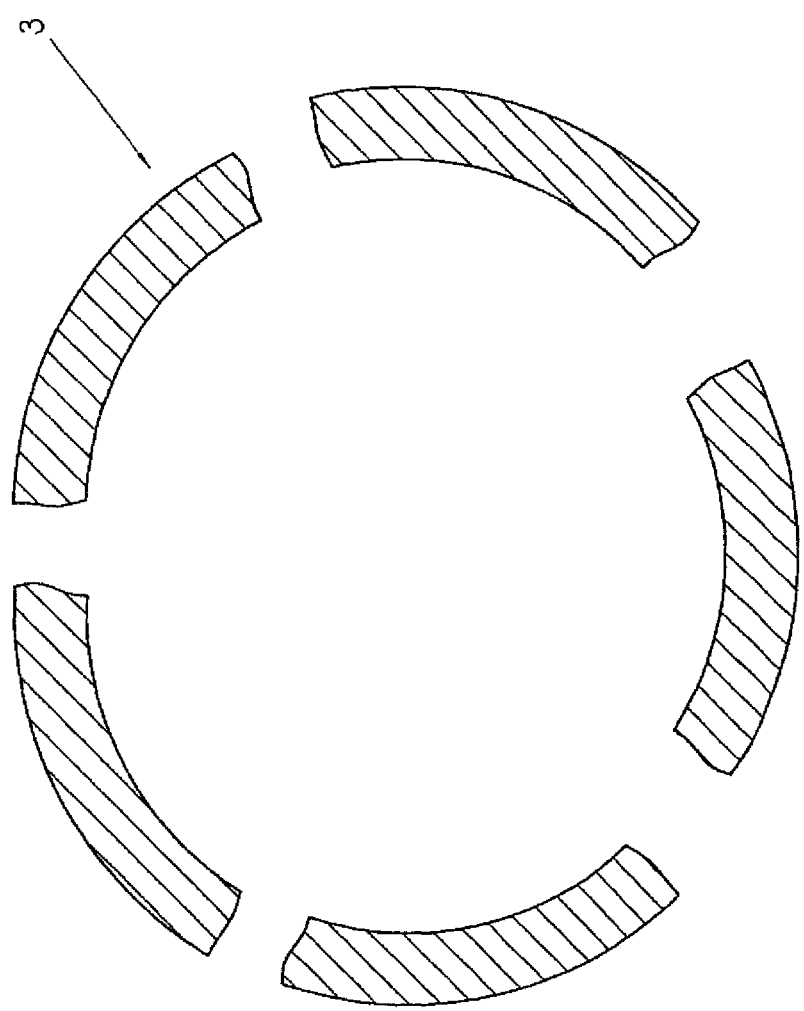
Figure 3:
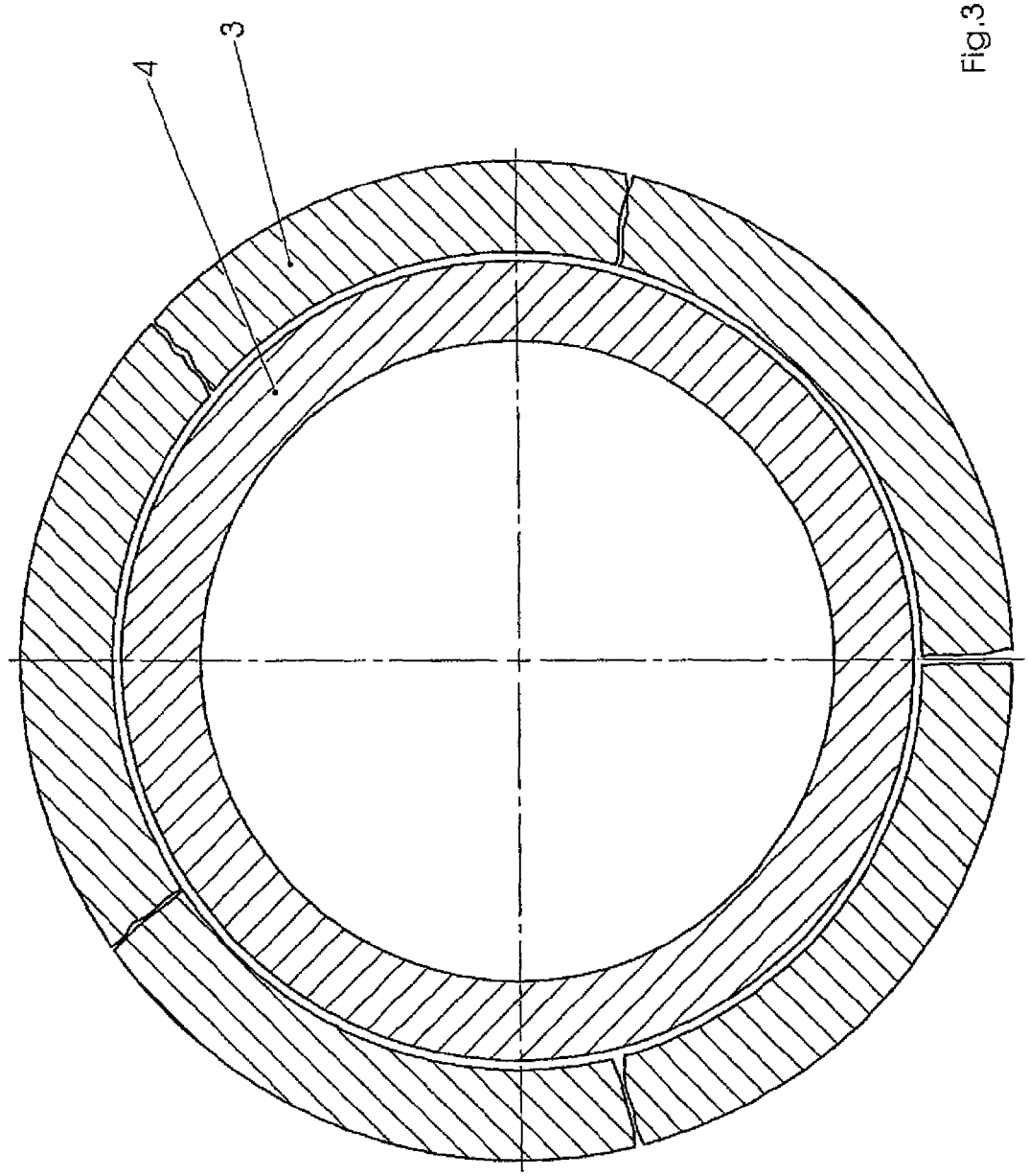

During the pulling-in the inner cross section of the old pipe 3 is widened by the conical base body 8 at the sites at which the old pipe is caved in or indented (compare. FIG. 2) almost to the original cross section in which conical base body 8—different than shown in FIG. 1—the greatest outer diameter is only slightly smaller than the inner diameter of the old pipe 3. Also, offsets in the old pipe 3 which may have been generated by a complete break of the old pipe 3 or in the region of sleeves can be compensated by the widening device. For this, the base body 8, beside the conical section, has a cylindrical section which adjoins the conical section and which ensures that the base body 8 when passing the offset brings the two sections which are separated by the offset, into a coaxial orientation. The widening device 7 thus has the effect that the old pipe 3 is widened again on those sites at which it was deformed whereby the radially compressed new pipe which follows the widening device can be pulled into the old pipe with a relatively small expenditure of force and without the risk of damage by sharp edged fragments which protrude into the free cross section.

Figure 4:
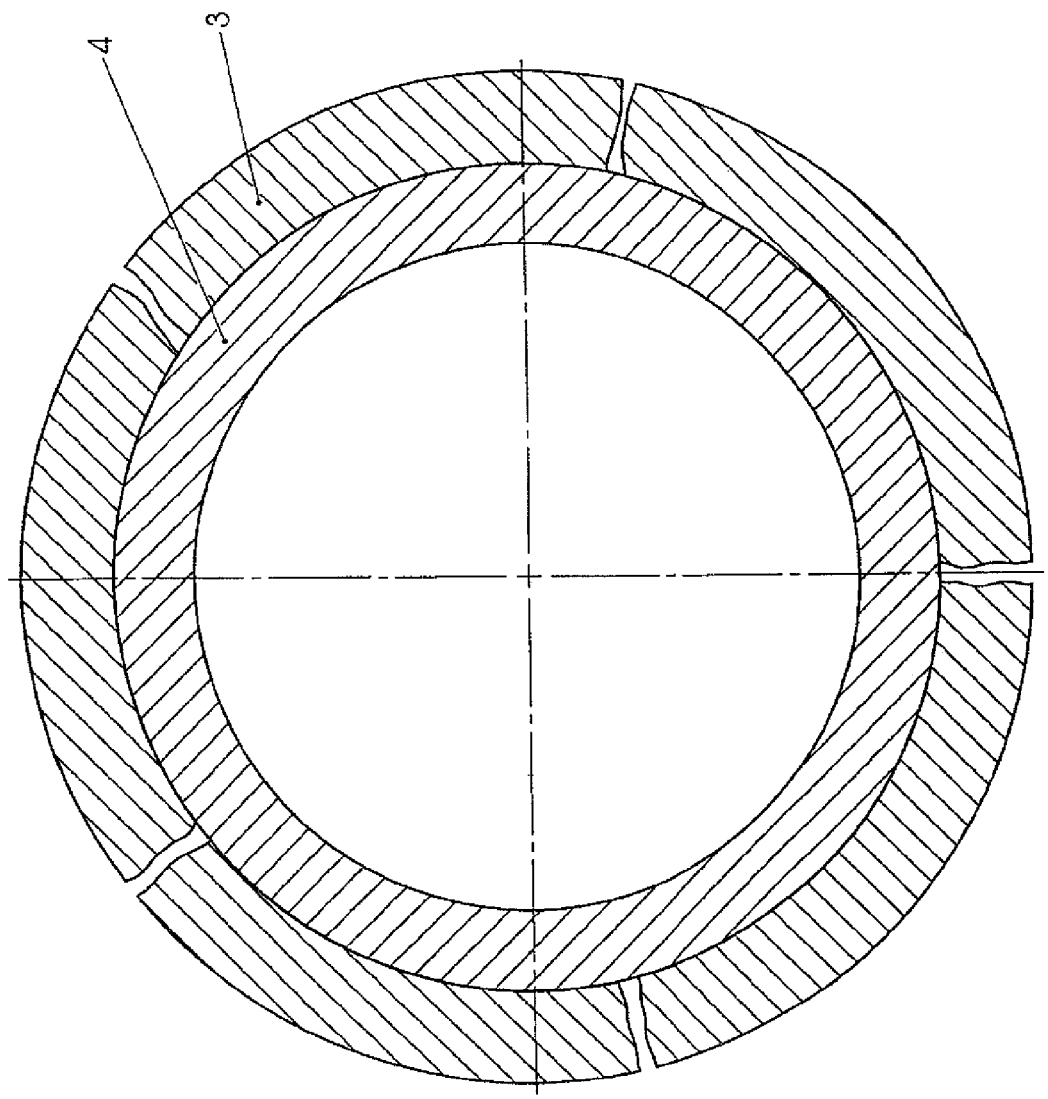
FIG. 4 the cross section of the old pipe according to the FIGS. 2 and 3, after a re-forming of the new pipe.

During the pulling-in of the new pipe 4, a continuous, section by section reduction of the outer diameter of the new pipe 4 occurs by means of the reduction device 1. At the same time, the reduction of the outer diameter is at least in part maintained during the entire pulling-in process in the respective section of the new pipe 4, because in this section of the new pipe 4, i.e. the section between the reduction device 1 and the widening device 7 significant tensile stresses are present which lead to a longitudinal stretching and simultaneous transverse contraction of the new pipe. These tensile stresses are caused by the pulling forces which are exerted on the new pipe via the pulling means and by the corresponding counter forces which are generated when the new pipe is deformed in the reduction device. These tensile stresses are only reduced when the new pipe 4 has been pulled in over the entire section of the old pipe 3 and the pulling means which is disposed at the front end of the adapter element is relieved. As soon as this relieve is accomplished, the pipe whose material (preferably polyethylene, short PE) has a certain shape memory, more or less forms back into its original cross section whereby the latter, due to the same or even greater diameter compared to the inner diameter of the old pipe, rests completely against the inner wall of the old pipe 3 (compare FIG. 4).

What is claimed is:

1. A method for rehabilitating an old pipe comprising
   reducing an outer diameter of a new pipe, said outer diameter corresponding at least to an inner diameter of the old pipe; and
   introducing the new pipe into the old pipe, wherein a widening device is moved ahead of the new pipe through the old pipe, wherein the reduction of the outer diameter is at least partially maintained during the introducing step, and wherein the widening device has a maximal outer diameter which is less than or equal to the inner diameter of the old pipe.

2. The method of claim 1, wherein the outer diameter of he new pipe is reduced by compressing the new pipe in a radial direction of the new pipe.

3. The method of claim 2, further comprising pulling the new pipe though a reduction device.

4. The method of claim 1, further comprising heating the new pipe.

5. The method of claim 1, wherein the reduction of the outer diameter is maintained by applying a defined pulling force.

6. A system for rehabilitating an old pipe comprising:
   a reduction device for reducing an outer diameter of a new pipe to a value smaller or equal to an inner diameter of an old pipe; and
   a widening device, said widening device having a maximal outer diameter which is less than or equal to the inner diameter of the old pipe and being configured for pulling the new pipe through the reduction device.

7. The system of claim 6, wherein the reduction device has a conical opening.

8. The system of claim 6, wherein the widening device comprises a conical base body.

9. The system of claim 8, wherein the widening device further comprises an adapter element, said adapter element having a side which is provided with first fastening means for fastening the adapter element on the new pipe and another side which is provided with second fastening means for fastening the adapter element on pulling means, wherein the adapter element is supported in an opening which extends along a longitudinal axis of he conical base body.

10. The system of claim 9, wherein the adapter element has at least one shoulder for supporting the adapter element on the conical base body when pulling forces are exerted on the adapter element via the pulling means.

\* \* \* \* \*

UNITED STATES PATENT AND TRADEMARK OFFICE
CERTIFICATE OF CORRECTION

PATENT NO. : 8,857,475 B2  
APPLICATION NO. : 13/520927  
DATED : October 14, 2014  
INVENTOR(S) : Elmar Koch Page 1 of 1

It is certified that error appears in the above-identified patent and that said Letters Patent is hereby corrected as shown below:

In the Claims

Claim 9, column 6, line 45, the word after "of" and before "conical" should be "the".

Signed and Sealed this  
Thirtieth Day of December, 2014

Michelle K. Lee  
*Deputy Director of the United States Patent and Trademark Office*